(12) United States Patent
Bogart

(10) Patent No.: US 9,301,495 B1
(45) Date of Patent: Apr. 5, 2016

(54) LIVESTOCK FEEDER

(71) Applicant: Mark Bogart, Joshua, TX (US)

(72) Inventor: Mark Bogart, Joshua, TX (US)

( * ) Notice: Subject to any disclaimer, the term of this patent is extended or adjusted under 35 U.S.C. 154(b) by 0 days.

(21) Appl. No.: 14/656,620

(22) Filed: Mar. 12, 2015

Related U.S. Application Data

(63) Continuation-in-part of application No. 14/091,118, filed on Nov. 26, 2013.

(51) Int. Cl.
*A01K 5/02* (2006.01)
*A01K 5/00* (2006.01)
*A01K 5/01* (2006.01)

(52) U.S. Cl.
CPC . *A01K 5/00* (2013.01); *A01K 5/005* (2013.01); *A01K 5/01* (2013.01); *A01K 5/02* (2013.01)

(58) Field of Classification Search
CPC .......... A01K 5/00; A01K 5/02; A01K 5/0225
USPC ........ 119/57.91; 239/665, 681, 687, 668, 669
See application file for complete search history.

(56) References Cited

U.S. PATENT DOCUMENTS

| | | | |
|---|---|---|---|
| 1,239,404 A * | 9/1917 | Knoll | B05B 12/02 119/51.15 |
| 3,738,326 A | 6/1973 | Atchley | |
| 4,040,389 A | 8/1977 | Walters | |
| 4,582,023 A | 4/1986 | Zumbahlen et al. | |
| 4,640,229 A | 2/1987 | Swartzendruber | |
| 4,712,717 A * | 12/1987 | Egerdahl | A01C 15/08 222/236 |
| 5,069,164 A | 12/1991 | Wiwi | |
| 5,463,980 A | 11/1995 | Rasmussen | |
| 5,794,561 A | 8/1998 | Schulz | |
| 6,988,465 B2 | 1/2006 | Park | |
| D624,708 S | 9/2010 | Meritt | |
| 7,866,579 B2 | 1/2011 | Chism | |
| 8,893,653 B2 * | 11/2014 | Browning | A01K 39/014 119/51.11 |
| 2014/0131468 A1 * | 5/2014 | Meritt | A01C 17/001 239/7 |

\* cited by examiner

*Primary Examiner* — Monica Williams
(74) *Attorney, Agent, or Firm* — Eric Karich; Karich & Associates

(57) ABSTRACT

A livestock feeder has a hopper, a feed outlet opening through the hopper for dispensing the feed, a feed trough operably positioned beneath the hopper for receiving the feed, and a broadcast spreader mechanism that includes a sling plate that is operably mounted to cover the feed outlet opening. The broadcast spreader mechanism has a motor for spinning the sling plate for broadcasting the feed outwardly when in operation. A retracting mechanism retracts the sling plate to uncover the feed outlet opening when the sling plate spins, so that the feed from the hopper falls downwardly into the broadcast spreader mechanism to be broadcast and dispensed. A tubular skirt surrounds the broadcast spreader mechanism for catching the feed as it is broadcast, and directing the feed downwardly into the feed trough.

13 Claims, 7 Drawing Sheets

LIVESTOCK FEEDER

CROSS-REFERENCE TO RELATED APPLICATIONS

This application for a utility patent is a continuation-in-part of a previously filed utility patent, still pending, having the application Ser. No. 14/091,118, filed Nov. 26, 2013.

BACKGROUND OF THE INVENTION

1. Field of the Invention

This invention relates generally to animal feeders, and more particularly to a feeder for dispensing feed to livestock and other domesticated animals.

2. Description of Related Art

Various feeders are known in the art for feeding livestock and similar domesticated animals. The prior art devices typically use gravity to pull feeds down from a hopper into a trough from which the animals can eat. Some of these devices include a spinning plate or similar mechanism for assisting in the proper dispensing of the feed. Some examples of such devices include the following: Wiwi, U.S. Pat. No. 5,069,164, describes an animal feeder having a rotatable feed plate. A spacer is carried by the feed plate to limit the amount of feed carried by the plate and further prevents accumulation of feed on the central portion feed plate. Limiting the amount of feed on the plate reduces the weight of feed to allow rotation of the plate by a smaller feeding animals.

Swartzendruber, U.S. Pat. No. 4,640,229, describes an apparatus for feeding livestock comprises a pan accessible to the livestock for feeding therefrom, a container for holding a quantity of feed comprising dry powdered feed and a mixing chamber. A dispensing mechanism dispenses measured increments of the feed to the mixing chamber and a control valve is coupled with a water supply line for dispensing measured increments of water to the mixing chamber. A mixer is selectively operable for mixing the water with the feed to produce a fluid feed mixture for delivery into the pan.

Rasmussen, U.S. Pat. No. 5,463,980, describes an animal feeder that includes a hopper of animal feed. A spinning plate dispensing mechanism is used for dispensing the feed from the hopper off of the spinning plate.

The prior art also teaches a broadcast spreader mechanism for broadcasting feed over a wide area of ground around the feeder mechanism, for attracting deer and similar animals to a particular area. Chism, U.S. Pat. No. 7,866,579, for example, teaches a deer feeder that ludes such a broadcast mechanism. These devices have never been used as livestock feeders, however, because it is not desirable to broadcast feed onto the ground for livestock, where it may become wet or contaminated, but instead to direct the feed into a trough for consumption. Instead, livestock feeders have used gravity chutes and spinning disks, as discussed above, for properly dispensing the feed.

The prior art teaches livestock feeders that include gravity chutes, which may include spinning wheels for proper dispensing of feed into a trough. The prior art teaches deer feeders that broadcast feed widely about the feeder onto the ground, for the purposes of attracting deer to a location. However, the prior art does not teach a livestock feeder that utilizes a broadcast spreader mechanism surrounded by a tubular skirt that directs the broadcast feed into a feed trough. The present invention fulfills these needs and provides further advantages as described in the following summary.

SUMMARY OF THE INVENTION

The present invention teaches certain benefits in construction and use which give rise to the objectives described below.

The present invention provides a livestock feeder for dispensing feed for consumption by livestock. The livestock feeder comprises a hopper for storing the feed; a feed outlet opening through the hopper for dispensing the feed; a feed trough operably positioned beneath the hopper for receiving the feed; a broadcast spreader mechanism that includes a sling plate that is operably mounted to cover the feed outlet opening, the broadcast spreader mechanism having a motor for spinning the sling plate for broadcasting the feed outwardly when in operation; a retracting mechanism for retracting the sling plate to uncover the feed outlet opening when the sling plate spins, so that the feed from the hopper falls downwardly into the broadcast spreader mechanism to be broadcast and dispensed; and a tubular skirt surrounding the broadcast spreader mechanism for catching the feed as it is broadcast, and directing the feed downwardly into the feed trough.

A primary objective of the present invention is to provide a livestock feeder having advantages not taught by the prior art.

Another objective is to provide a livestock feeder that utilizes a broadcast spreader mechanism surrounded by a tubular skirt that directs the broadcast feed into a feed trough.

The prior art also does not teach a livestock feeder that utilizes the novel fence and blinder system that is included in the present invention.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a livestock feeder 10 for dispensing feed 12 into a feed trough for consumption by livestock or similar animals.

Figure 1:
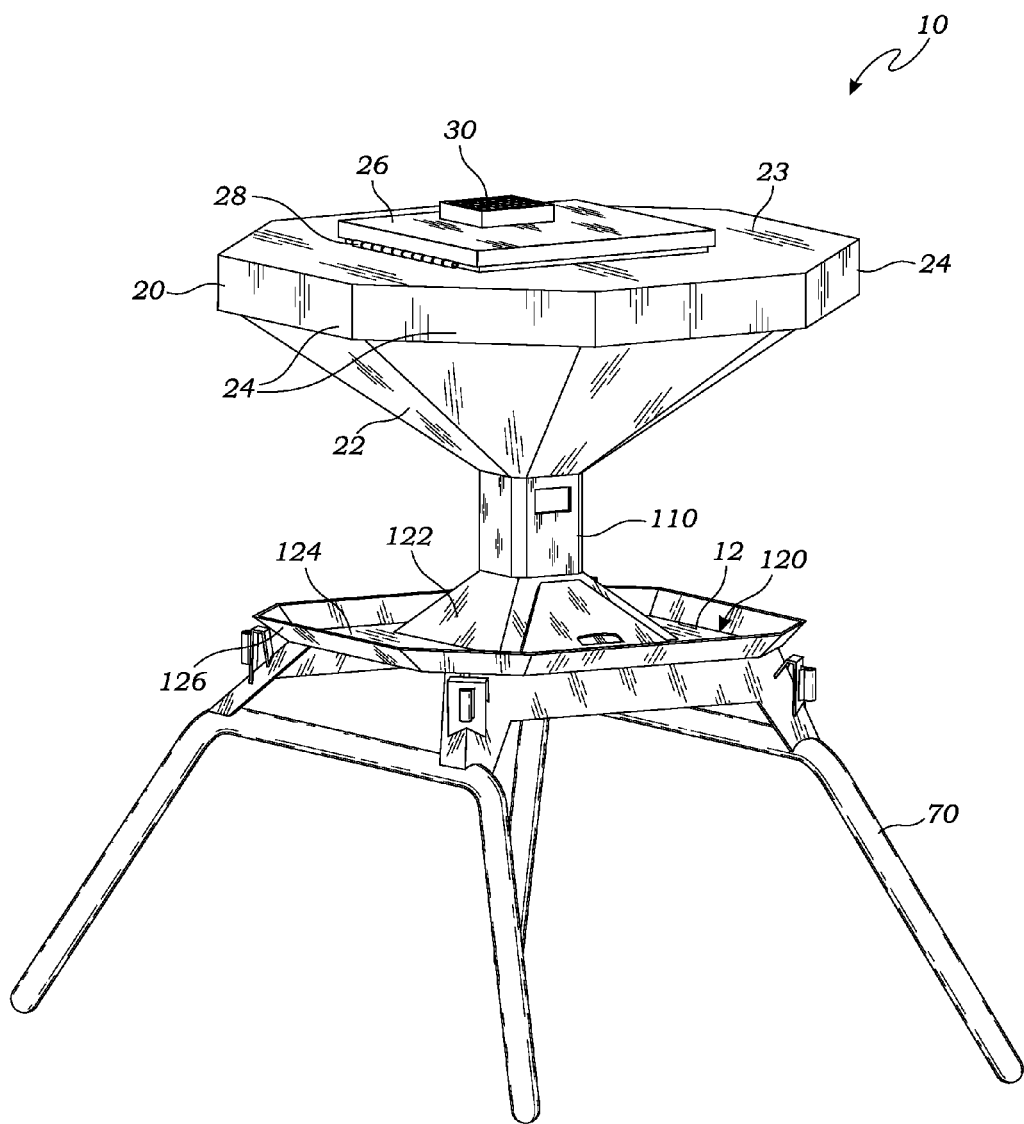
FIG. 1 is a perspective view of a livestock feeder according to one embodiment of the present invention.

FIG. 1 is a perspective view of one embodiment of the livestock feeder 10. As illustrated in FIG. 1, the livestock feeder 10 includes a hopper 20 that is adapted to contain the to feed 12 (shown in FIGS. 2-3, and as discussed below). In this embodiment, the hopper 20 includes a bottom wall 22, a roof 23, and side walls 24 that together define a hopper interior 34 (shown in FIG. 2, and as discussed below) for storing the feed 12. The hopper 20 may be of any suitable size and shape for storing the feed 12 in sufficient quantity.

In the present embodiment, the side walls 24 may extend generally vertically from the bottom wall 22 and serve to contain the feed 12. In the present application, the side walls 24 are made of multiple vertical plates, and the bottom wall 22 is comprised of plates that form a roughly pyramidal shape. This construction may vary, of course, and include any construction known in the art for forming a suitable container for the feed 12. While FIG. 1 illustrates one embodiment of the hopper 20, those skilled in the art may devise alternative embodiments, and these alternative or equivalent are considered within the scope of the present invention.

The livestock feeder 10 is supported above the ground by base legs 70, which in this embodiment are connected to the hopper 20 via a feed trough 120. While FIG. 1 illustrates one embodiment of the base legs 70, those skilled in the art may devise alternative embodiments, and these alternative or equivalent are considered within the scope of the present invention.

As shown in FIG. 1, the feed trough 120 of this embodiment includes a frustoconical middle section 122 that extends to an outwardly extending trough basin 124 to an upwardly extending rim flange 126. For purposes of this application, the term "frustoconical" is defined to include any generally frustoconical shape, including a conical shape, and faceted pyramid-type shapes, that function to disperse the feed 12 into the outwardly extending trough basin 124, from which the livestock may eat the feed 12. The upwardly extending rim flange 126 surrounds the outwardly extending trough basin 124 to keep the feed 12 from falling out of the feed trough 120. For purposes of this application, the term "livestock" is defined to include any common form of livestock (e.g., cattle, horses, etc.), and also any similar or related animals that a person may want to supply with feed 12, and the term should be broadly construed.

Figure 2:
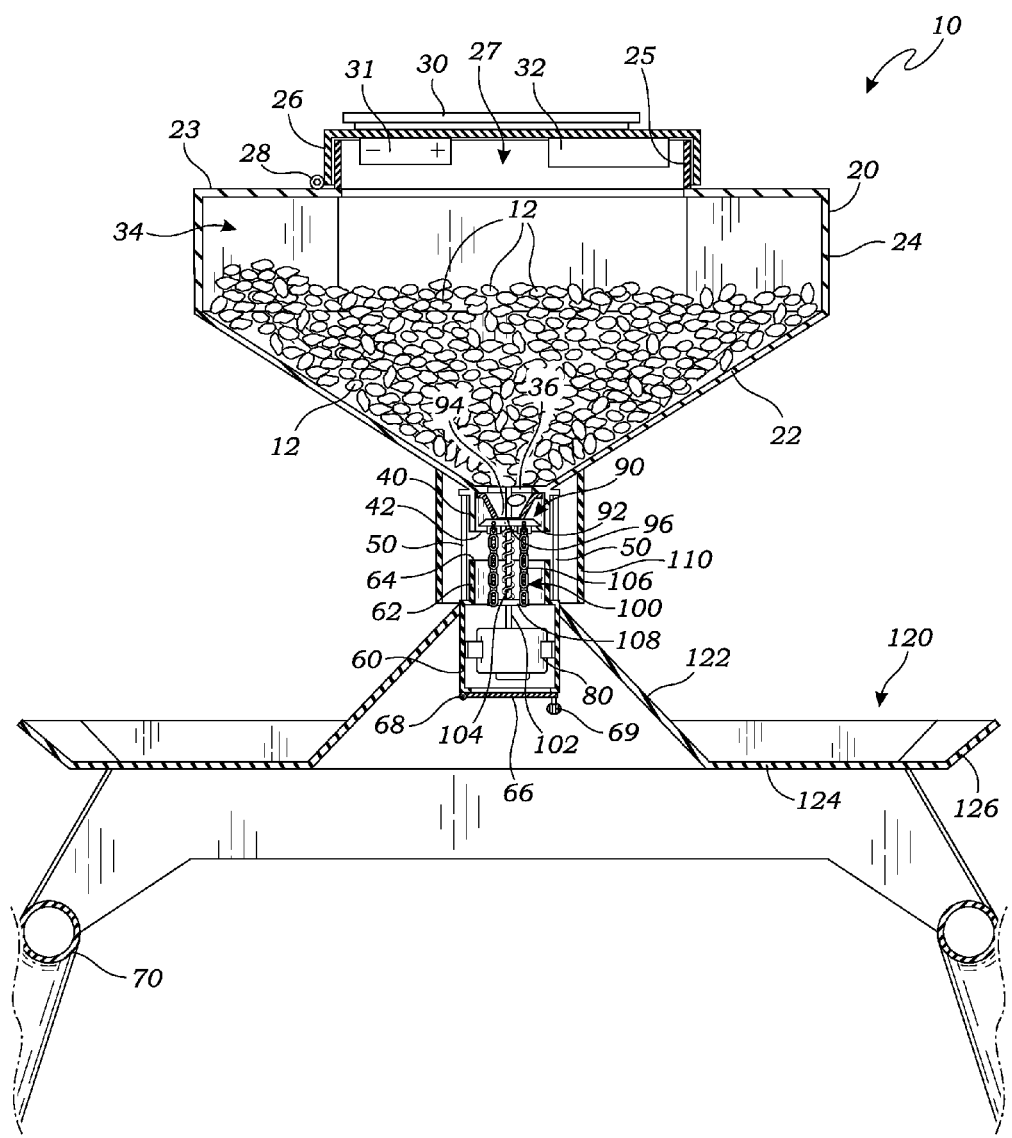
FIG. 2 is a side elevational sectional view thereof.

FIG. 2 is a side elevational sectional view of the livestock feeder 10. As shown in FIG. 2, the hopper 20 may include an opening 27 for inserting the feed 12 into the hopper 20. In this embodiment, the opening 27 is in the roof 23 of the hopper 20, and the hopper 20 further includes a cover 26 for covering the opening 27 for protecting the feed 12. The cover 26 may be attached to the roof 23, or alternative to the side walls 24, or in any other location deemed suitable by those skilled in the art, and in any manner known in the art. In this embodiment, the cover 26 is attached to the roof 23 with a hinge 28. In this embodiment, a flange 25 extends vertically from the roof 23. The flange 25 is for sealing the cover tightly over and preventing water or other debris from entering the hopper interior 34. Alternatively, the cover 26 may be connected to the hopper 20 at the flange 25 rather than the roof 23, or in any other location, or the hinge 28 may be omitted. The cover 26 may be opened to add more of the feed 12. While FIG. 1 illustrates one embodiment of the opening 27 and cover 26, those skilled in the art may devise alternative embodiments, and these alternative or equivalent are considered within the scope of the present invention.

As shown in FIG. 2, the livestock feeder 10 includes a feed outlet opening 36 that extends through the bottom wall 22 of the hopper 20, so that the feed 12 may fall through and escape from the hopper interior 34. In this embodiment, a feeder tube 40 extends downwardly from the hopper 20, around the feed outlet opening 36, to an upper perimeter 42, for directing the feed 12 which falls from the hopper interior 34 through the feed outlet opening 36. The feeder tube 40 may be of any cross-sectional shape (e.g., cylindrical, rectangular, octagonal, etc.), although in the present embodiment it is cylindrical.

While FIG. 2 illustrates one embodiment of the feeder tube 40, those skilled in the art may devise alternative embodiments, and these alternative or equivalent are considered within the scope of the present invention.

In this embodiment, support struts 50 support the hopper 20 above a feed trough 120, and to support the upper perimeter 42 of the feeder tube 40 a distance from a lower perimeter 64 of an annular wall 62, discussed below, to form an annular feed discharge slot 52. The support struts 50 may be rods, tubes, or any other form of vertical support structure. While FIG. 2 illustrates one embodiment of the support struts 50, those skilled in the art may devise alternative embodiments, and these alternative or equivalent are considered within the scope of the present invention.

In this embodiment, a lower housing 60 is formed beneath the hopper 20. The lower housing 60 may include the annular wall 62 that extends upwardly from the lower housing 60 to the lower perimeter 64. The lower housing 60 may be connected to the support struts 50 and provide a base for the support struts 50 when supporting the hopper 20. The lower housing 60 may also include a door 66 to gain access to the interior of the lower housing 60, a door lock 69 operably connected to the door 66 for locking the door, and a door hinge 68 operably connecting the door 66 to the lower housing 60 allowing the door 66 to open and close. While FIG. 1 illustrates one embodiment of the lower housing 60, those skilled in the art may devise alternative embodiments, and these alternative or equivalent are considered within the scope of the present invention.

Figure 3:
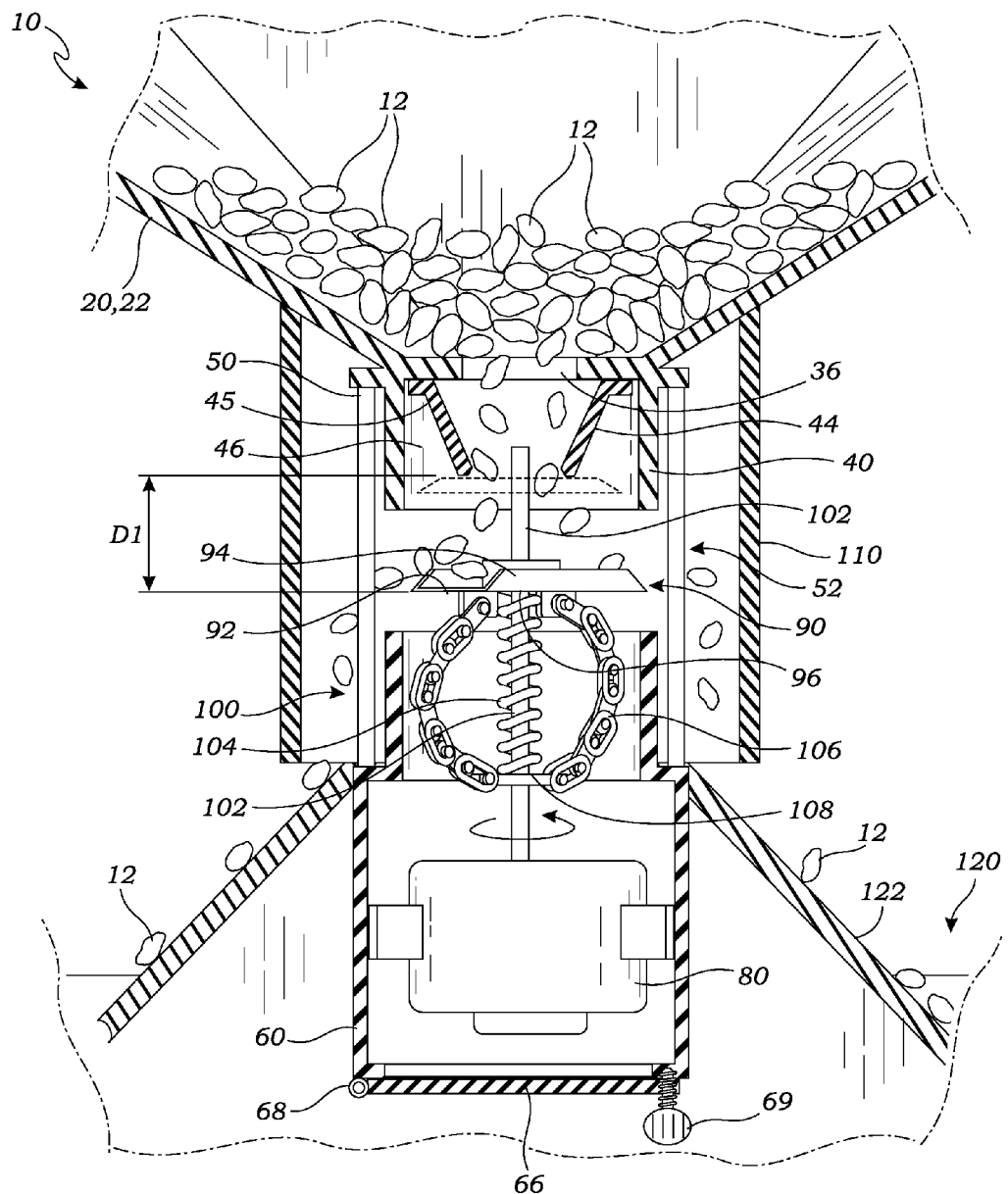
FIG. 3 is a close up view of a the broadcast spreader mechanism, illustrating how feed from a hopper flows down through a broadcast spreader mechanism from which it is ejected outwardly against a tubular skirt surrounding the broadcast spreader mechanism so that it falls down into a feed trough.

FIG. 3 is a close up view of a broadcast spreader mechanism 90 of the livestock feeder 10, illustrating how the feed 12 from the hopper 20 flows down through the broadcast spreader mechanism 90 from which it is ejected outwardly against a tubular skirt 110 surrounding the annular feed discharge slot 52 so that the feed 12 falls down into the feed trough 120. The momentum of the feed 12 falling downwardly onto the frustoconical middle section 122 of the feed trough 120 causes the feed 12 to spread across the feed trough 120 for easier access by the animals, rather than piling around the center of the feed trough 120 where the animals may have difficulty reaching it. This also prevents some of the feed 12 being trapped in the center and spoiling before it is consumed.

As shown in FIGS. 2 and 3, in this embodiment the broadcast spreader mechanism 90 is operably mounted in the lower housing 60. In this embodiment, the broadcast spreader mechanism 90 includes a sling plate 92 that is slidably mounted on a shaft 102 that is operably mounted on a motor 80. The shaft 102 extends through an aperture 96 of the sling plate 92. As the feed 12 falls from the hopper 20, the rotation of the sling plate 92 ejects the feed 12 out of the discharge slot 52 and against the tubular skirt 110 that extends down over the annular feed discharge slot 52. In this embodiment, the sling plate 92 includes a generally U-shaped cross-section for more effectively ejecting the feed 12, with side walls 94 extending upwardly to more effectively sling the feed 12 as described.

As shown in FIG. 2, the sling plate 92 is typically maintained in a position to cover the feed outlet opening 36 and prevent the feed 12 from escaping the hopper 20. In this embodiment, this is accomplished by a spring 104 which biases the sling plate 92 upwardly to cover the feed outlet opening 36. In some embodiments, the sling plate 92 may directly abut the feed outlet opening 36. In the present embodiment, however, the feed outlet opening 36 includes a funnel 44 extending from the bottom wall 22 of the hopper 20 around the feed outlet opening 36, to enable the sling plate 92 to more effectively cover the feed outlet opening 36. While the funnel 44 is used in the present embodiment, another form of tube or other structure could similarly be used.

In this embodiment, the funnel 44 has an upper aperture 45 and a lower aperture 46, centrally aligned on a common axis, wherein the area of the upper aperture 45 is larger than the area of the lower aperture 46 and serves to further collimate the downward flow of the feed 12. In the closed state with the sling plate 92 abutting the lower aperture 46 of the funnel 44, (as shown in the dashed outline in FIG. 3) the separation between the upper aperture 45 and the lower aperture 46 defines a distance D1 between the lower aperture 45 and the sling plate 92. In the present embodiment, D1 is between 1/8" and 1/4", though in other embodiments other sizes of D1 are possible.

The broadcast spreader mechanism 90 may further include a retracting mechanism 100 for retracting the sling plate 92 against the bias of the spring 104, as shown in FIG. 3, so that the feed outlet opening 36 is opened and the feed 12 is dispensed. In the embodiment of FIGS. 2 and 3, the retracting mechanism 100 includes a pair of linkages 106 that each connect the sling plate 92 with a lower attachment point 108 of the shaft 102. The spring 104 between the lower attachment point 108 and the sling plate 92 biases the sling plate 92 upwardly towards the hopper 20 against the funnel 44 to cover the feed outlet opening 36.

The shaft 102 is connected to the motor 80 such that when the motor 80 is running, the shaft 102 spins, which spins the lower attachment point 108, the pair of linkages 106, and thus the sling plate 92. The spring 104 may be of any type known to one skilled in the art, and is for providing an upward force sufficient to keep the broadcast spreader mechanism 90 firmly abutting and sealing the feed outlet opening 36 when the broadcast spreader mechanism 90 is not rotating via the motor 80. The spring 104 may surround the guide shaft 102 in a coaxial manner or may be placed in other manners, e.g., adjacent to the guide shaft 102.

As shown in FIG. 3, when the shaft 102 is spinning via the motor 80, the pair of linkages 106 are pulled apart by centripetal force, and function to pull down the sling plate 92 against the upward force of the spring 104. In alternative embodiments, there may be one, two, or more of the linkages 106 arranged adjacent or around the shaft 102; however, an even number is preferred for proper balance. The pair of linkages 106 may be, for example, chains, ropes, cables, or other similar elements known to one skilled in the art. The pair of linkages 106 may also have additional weights (not shown) for providing additional angular momentum when rotating, rather than relying solely on the mass of the linkages 106. While FIG. 2 illustrates one embodiment of the linkages 106, those skilled in the art may devise alternative embodiments, and these are within the scope of the present invention.

The motor 80 may be powered by a battery 31 attached, in the present embodiment, to the bottom of the cover 26. In other embodiments, the motor 80 may be powered by other similar power sources, fuels, or by an external power source. The motor 80 may be of any type known to one skilled in the art, such as electric, gasoline, etc.

Also shown in FIG. 2 is a section of the cover 26, which may also include a solar panel 30 for charging the battery 31, and a timer 32 for actuating the motor 80 at predetermined times or intervals. The timer 32 and battery 31 are operably connected to the motor 80 so that the timer 32 may operably control the motor 80 turn on and off as desired, e.g., at uniform intervals, or according to a predetermined schedule. The intervals and durations of feedings are adjusted according to the hour, day, season, etc., as desired by one skilled in the art.

As shown in FIG. 3, when the motor 80 is activated, the retracting mechanism 100 lowers the sling plate 92 so that feed 12 falls from the hopper 20, and the broadcast spreader mechanism 90 (i.e., the spinning sling plate 92) ejects the feed 12 out of the annular feed discharge slot 52, so that the feed 12 impacts the tubular skirt 110, and falls down onto the frustoconical middle section 122 which distributes the feed 12 across the feed trough 120, as discussed above.

Figure 4:
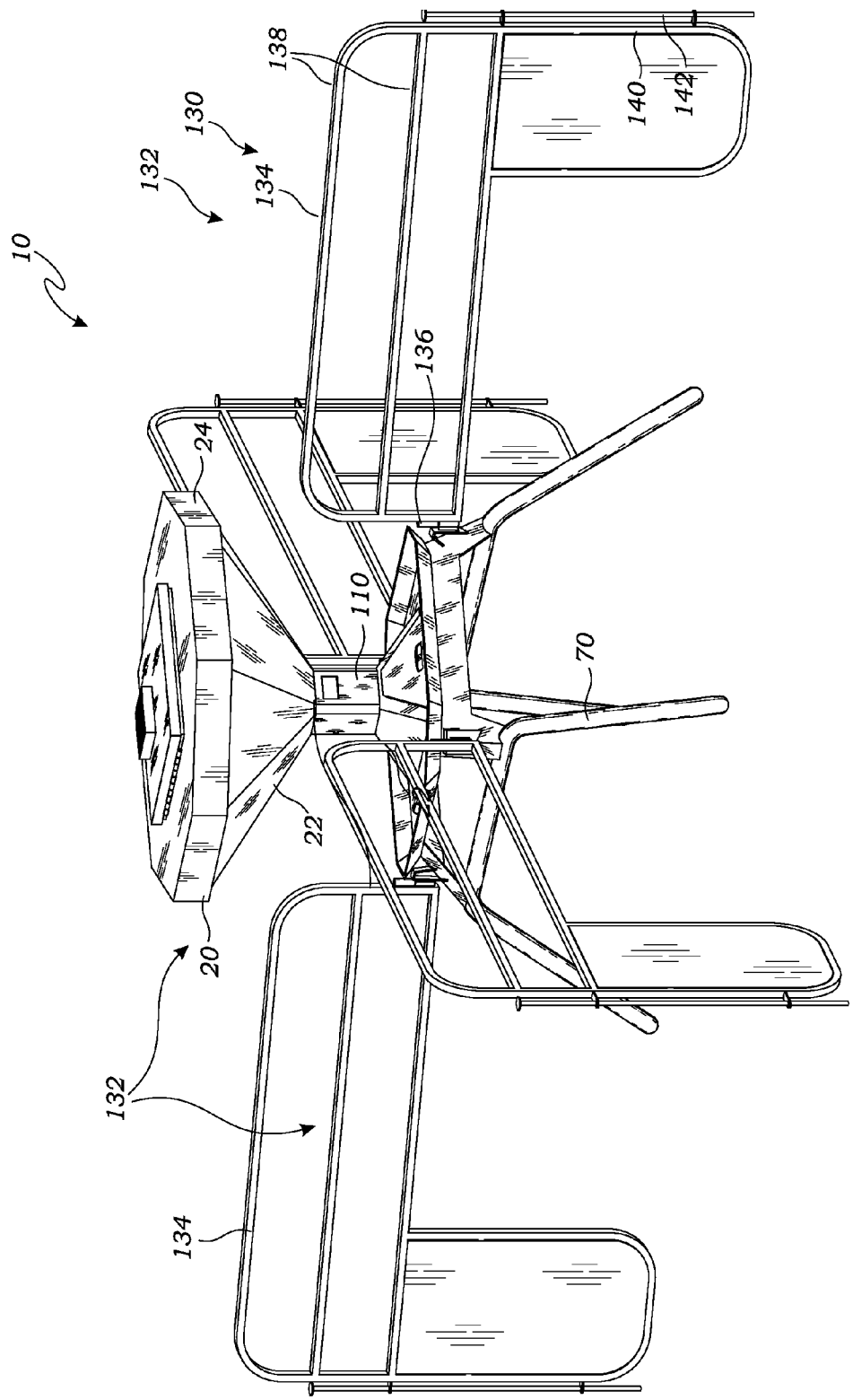
FIG. 4 is a perspective view of the livestock feeder of FIG. 1, further including a fence system that separates an area around the livestock feeder into zones.
Figure 5:
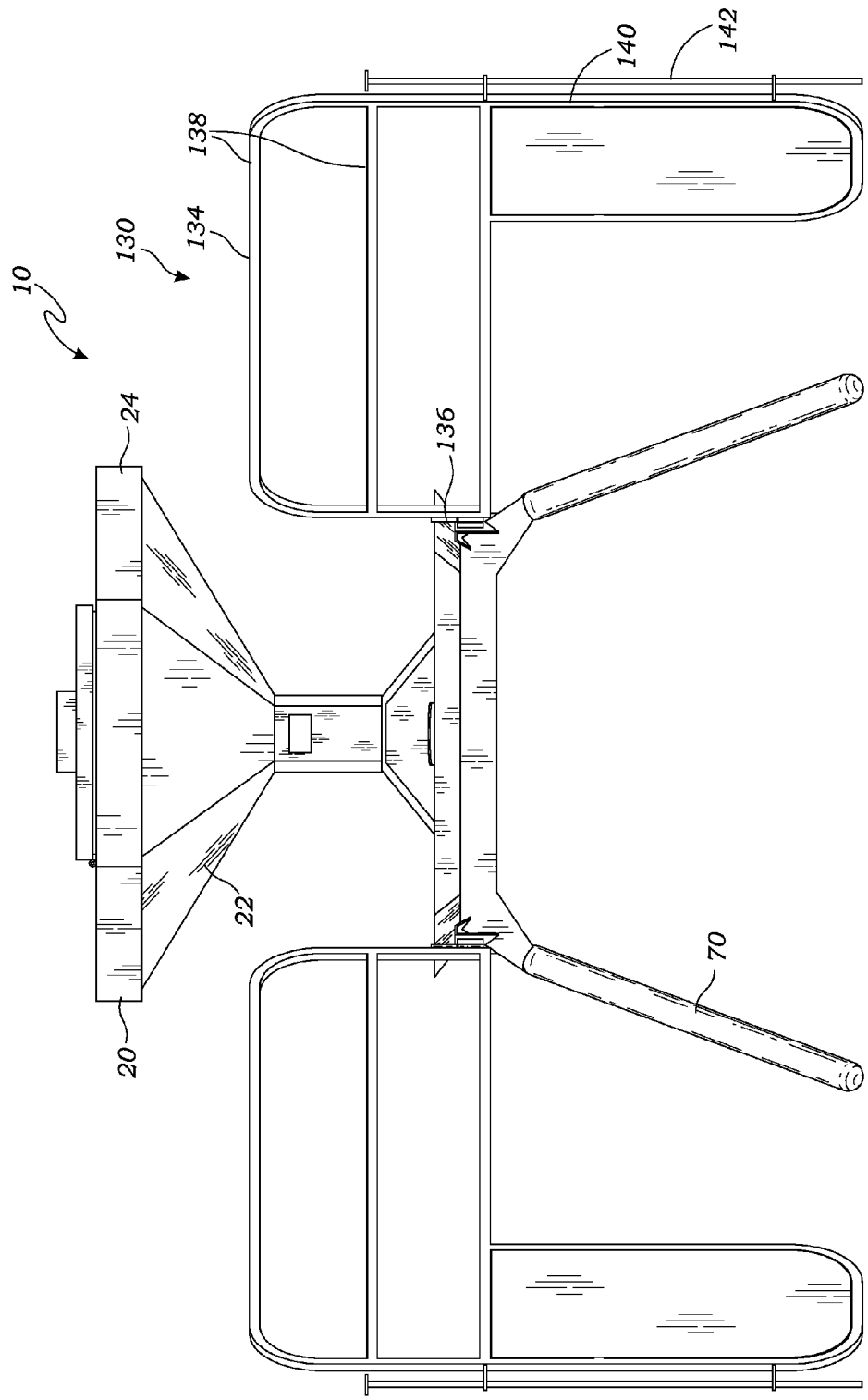
FIG. 5 is a front elevational view of the livestock feeder of FIG. 4.

FIG. 4 is a perspective view of the livestock feeder 10 of FIG. 1, further including a fence system 130 that separates the area around the livestock feeder 10 into zones 132. FIG. 5 is a front elevational view of the livestock feeder 10 of FIG. 4. As shown in FIGS. 4-5, the fence system 130 includes a plurality of fence sections 134 that are attached via hinges 136 to the livestock feeder 10. Each of the fence sections 134 includes horizontal rods 138 that are held at a suitable height by vertical legs 140. A locking rod 142 may be slidable mounted on each of the legs 140 for anchoring the fence sections 134 into the ground.

Figure 6:
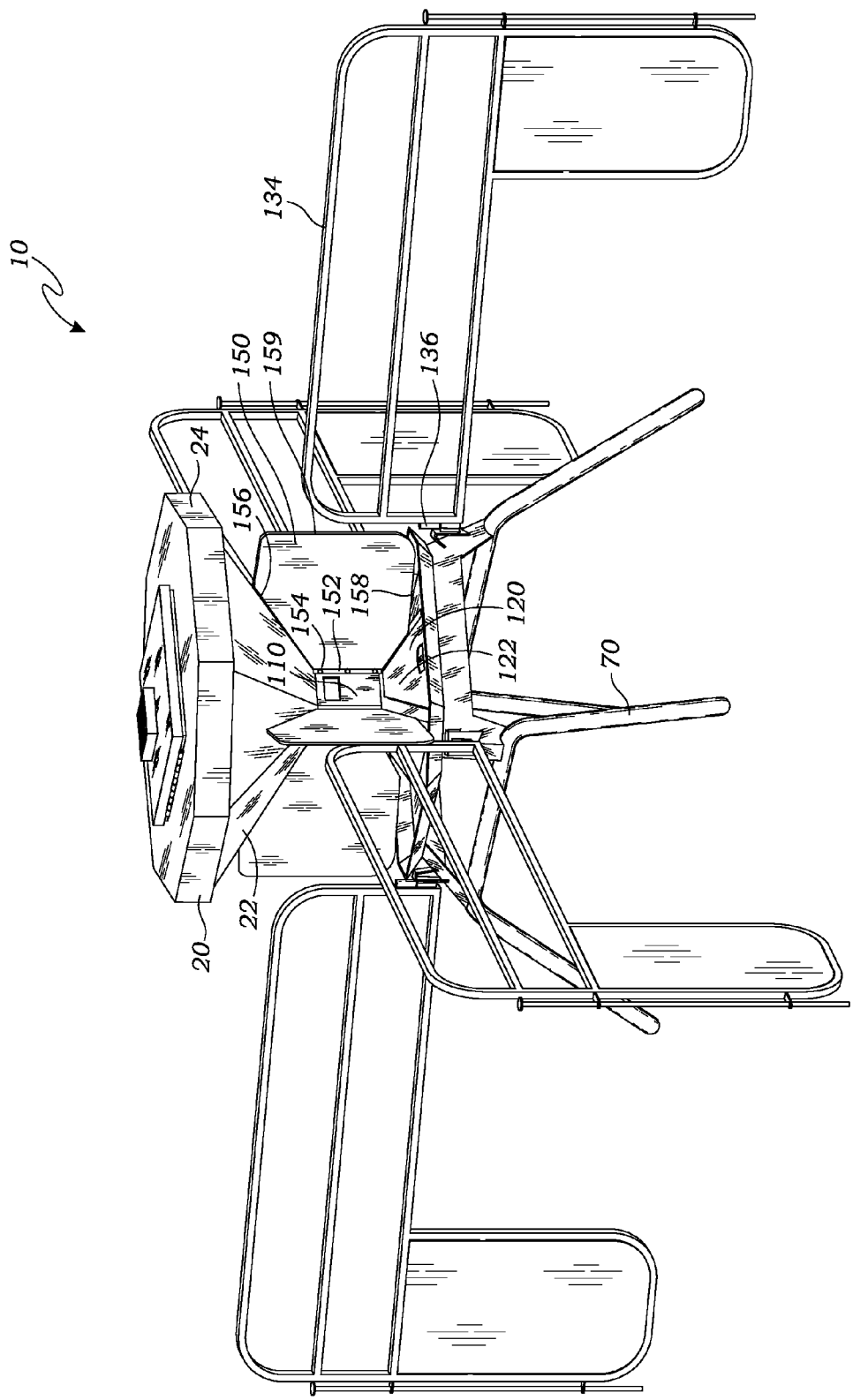
FIG. 6 is a perspective view of the livestock feeder of FIG. 4, further including blinder panels operably mounted on the livestock feeder.

FIG. 6 is a perspective view of the livestock feeder 10 of FIG. 4, further including blinder panels 150 operably mounted on the livestock feeder 10. As shown in FIG. 6, each of the blinder panels 150 include a mounting mechanism 152 for mounting the blinder panel 150 on the livestock feeder 10. In this embodiment, the mounting mechanism 152 includes an inner flange that is attached with fasteners 154 (e.g., bolts) to the tubular skirt 110 (or alternatively, to the hopper 20, or other suitable location. The blinder panels 150 are shaped to substantially fill the space between the hopper 20 and the trough 120, preferably with a top edge 156 that is adjacent to or abuts the hopper 20, a lower edge 158 that is adjacent to or abuts the feed trough 120, and an outer edge 156 that extends to adjacent to or abutting one of the fence sections 134. The blinder panels 150 function to separate the animals feeding at the feed trough 120.

Figure 7:
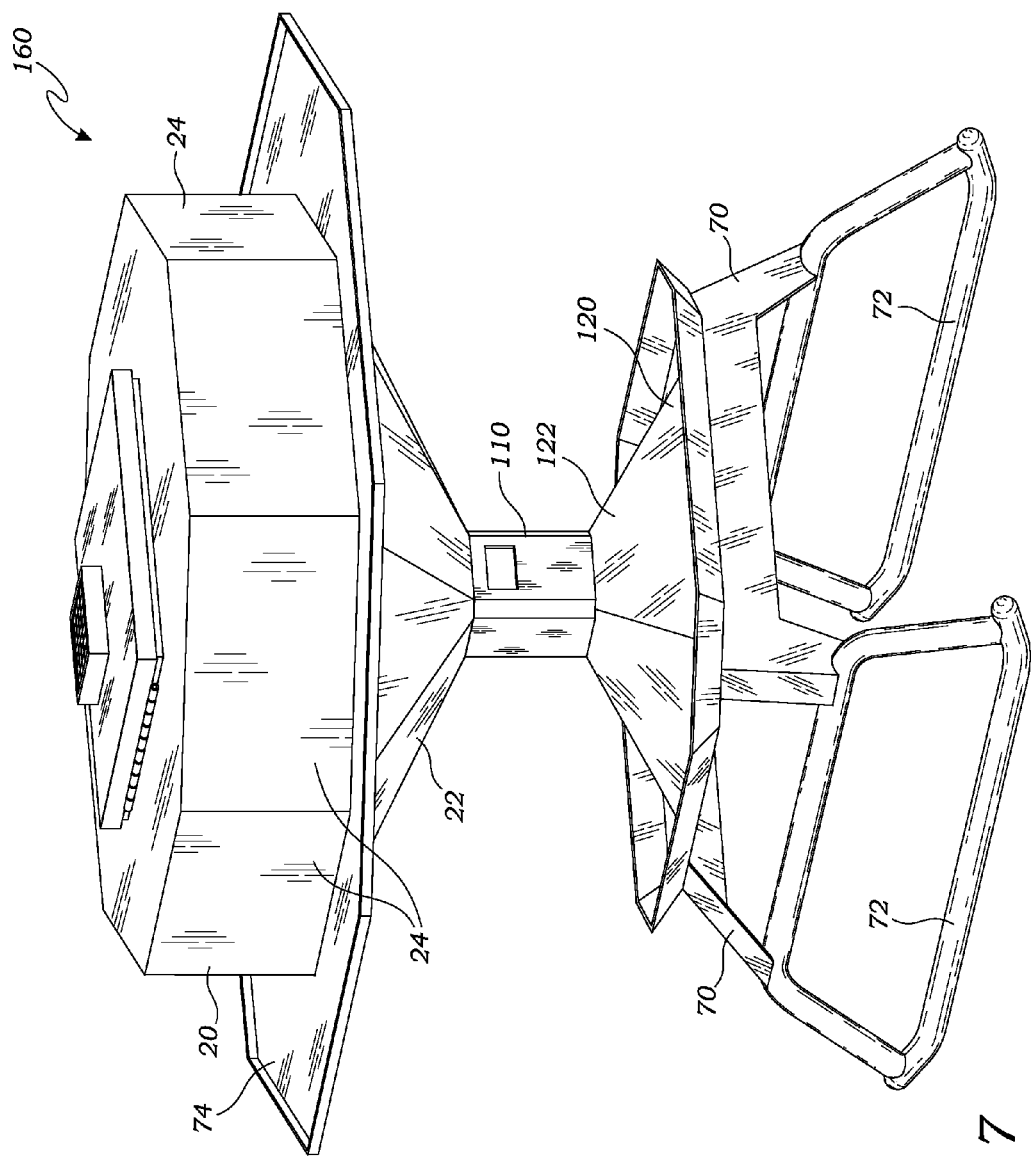
FIG. 7 is a perspective view of a second embodiment of the livestock feeder.

FIG. 7 is a perspective view of a second embodiment of the livestock feeder 160. This embodiment of the livestock feeder 160 is lower to the ground, and the legs 70 extend to skids 72. In this embodiment, the hopper 20 further includes an outwardly extending flange 74 that helps prevent animals from climbing onto the hopper 20.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A livestock feeder for dispensing feed for consumption by livestock, the livestock feeder comprising:
   a hopper for storing the feed;
   a feed outlet opening through the hopper for dispensing the feed;
   a feed trough operably positioned beneath the hopper for receiving the feed;
   a broadcast spreader mechanism that includes a sling plate that is operably mounted to cover the feed outlet opening, the broadcast spreader mechanism having a motor for spinning the sling plate for broadcasting the feed outwardly when in operation;
   a retracting mechanism for retracting the sling plate to uncover the feed outlet opening when the sling plate spins, so that the feed from the hopper falls downwardly into the broadcast spreader mechanism to be broadcast and dispensed;

a tubular skirt surrounding the broadcast spreader mechanism for catching the feed as it is broadcast, and directing the feed downwardly into the feed trough; and a lower housing formed beneath the hopper, the motor being mounted in the lower housing, the lower housing being separated from the hopper with a plurality of support struts, to form an annular feed discharge slot between the lower housing and the hopper, wherein the tubular skirt covers the annular feed discharge slot, and wherein the discharge mechanism ejects the feed through the annular feed discharge slot and against the tubular skirt.

2. The livestock feeder of claim 1, wherein the hopper further comprises:

a solar panel operably connected to a battery; and a timer operably connecting the battery and the motor.

3. The livestock feeder of claim 1, further comprising blinder panels operably mounted on the livestock feeder, each of the blinder panels include a mounting mechanism for mounting the blinder panel on the livestock feeder.

4. The livestock feeder of claim 3, wherein the mounting mechanism includes an inner flange that is attached with fasteners to the tubular skirt.

5. The livestock feeder of claim 3, wherein the blinder panels are each shaped to substantially fill the space between the hopper and the trough, comprising a top edge that is adjacent to or abuts the hopper, a lower edge that is adjacent to or abuts the feed trough.

6. The livestock feeder of claim 1, further comprising a fence system that separates an area around the livestock feeder into zones, the fence system including a plurality of fence sections that are attached via hinges to the livestock feeder, each of the fence sections including horizontal rods that are held at a suitable height by vertical legs.

7. The livestock feeder of claim 6, further comprising a locking rod slidable mounted on each of the legs for anchoring the fence sections into the ground.

8. The livestock feeder of claim 1, wherein the broadcast spreader mechanism comprises a shaft operably connecting the motor for spinning the sling plate.

9. The livestock feeder of claim 8, wherein the sling plate is slidably mounted on the shaft, and wherein the retraction mechanism includes a pair of linkages that each connect the sling plate with a lower attachment point of the shaft, and a spring operably mounted between the lower attachment point and the sling plate to bias the sling plate upwardly towards the hopper so that the sling plate covers the feed outlet opening, but such that when the shaft is spinning via the motor, the pair of linkages are pulled apart by centripetal force and function to pull down the sling plate downwardly against the upward force of the spring, such that the sling plate is refracted from the hopper.

10. The livestock feeder of claim 9, wherein the hopper includes a funnel extending from the bottom wall of the hopper around the feed outlet opening, wherein the funnel has an upper aperture and a lower aperture, centrally aligned on a common axis, such that in a closed state the sling plate abuts the lower aperture of the funnel.

11. The livestock feeder of claim 1, wherein the sling plate has a generally U-shaped cross-section having side walls extending upwardly to more effectively sling the feed while the sling plate is spinning.

12. A livestock feeder for dispensing feed for consumption by livestock, the livestock feeder comprising:

a hopper for storing the feed;

a feed outlet opening through the hopper for dispensing the feed;

a feed trough operably positioned beneath the hopper for receiving the feed;

a broadcast spreader mechanism that includes a sling plate that is operably mounted to cover the feed outlet opening, the broadcast spreader mechanism having a motor for spinning the sling plate for broadcasting the feed outwardly when in operation;

a retracting mechanism for retracting the sling plate to uncover the feed outlet opening when the sling plate spins, so that the feed from the hopper falls downwardly into the broadcast spreader mechanism to be broadcast and dispensed, wherein the broadcast spreader mechanism comprises a shaft operably connecting the motor for spinning the sling plate;

a tubular skirt surrounding the broadcast spreader mechanism for catching the feed as it is broadcast, and directing the feed downwardly into the feed trough, wherein the retraction mechanism includes a pair of linkages that each connect the sling plate with a lower attachment point of the shaft, a spring between the lower attachment point and the sling plate to bias the sling plate upwardly towards the hopper to cover the feed outlet opening, such that when the shaft is spinning via the motor, the pair of linkages are pulled apart by centripetal force, and function to pull down the sling plate downwardly against the upward force of the spring, such that the sling plate is retracted from the hopper; and a lower housing formed beneath the hopper, the motor being mounted in the lower housing, the lower housing being separated from the hopper with a plurality of support struts, to form an annular feed discharge slot between the lower housing and the hopper, wherein the tubular skirt covers the annular feed discharge slot, and wherein the discharge mechanism ejects the feed through the annular feed discharge slot and against the tubular skirt.

13. A livestock feeder for dispensing feed for consumption by livestock, the livestock feeder comprising:

a hopper for storing the feed;

a feed outlet opening through the hopper for dispensing the feed;

a feed trough operably positioned beneath the hopper for receiving the feed;

a lower housing formed beneath the hopper, separated from the hopper with a plurality of support struts, to form an annular feed discharge slot between the lower housing and the hopper;

a broadcast spreader mechanism that includes a sling plate that is operably mounted to cover the feed outlet opening, the broadcast spreader mechanism having a motor mounted in the lower housing for spinning the sling plate for broadcasting the feed outwardly though the annular feed discharge slot when in operation;

a retracting mechanism for retracting the sling plate to uncover the feed outlet opening when the sling plate spins, so that the feed from the hopper falls downwardly into the broadcast spreader mechanism to be broadcast and dispensed; and a tubular skirt surrounding the annular feed discharge slot for catching the feed as it is broadcast, and directing the feed downwardly into the feed trough.

* * * * *